April 2, 1963   A. C. SAMPIETRO ET AL   3,084,324
ALTERNATOR DRIVE
Filed Aug. 2, 1960   2 Sheets-Sheet 1
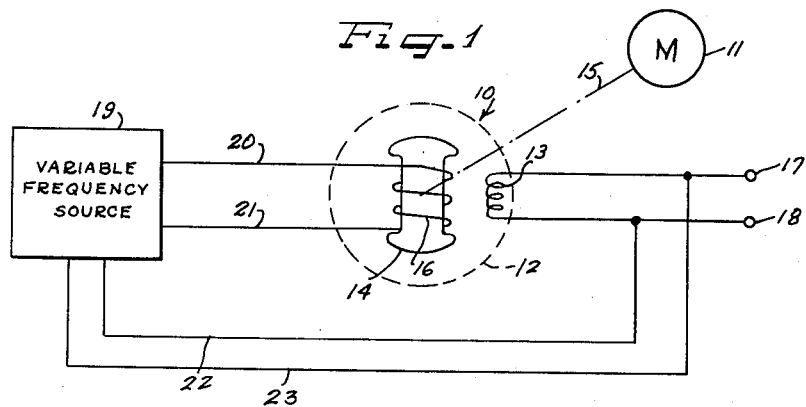
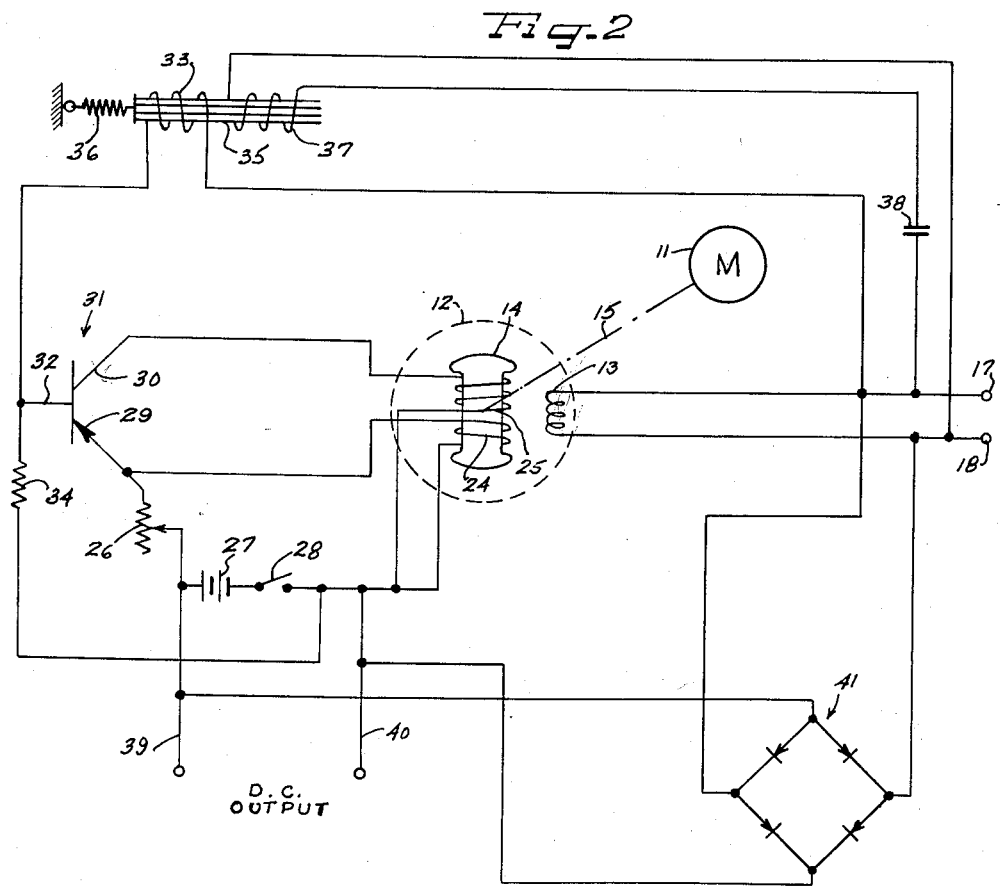
INVENTORS
Achilles C. Sampietro
John D. Grigsby
BY
ATTORNEYS

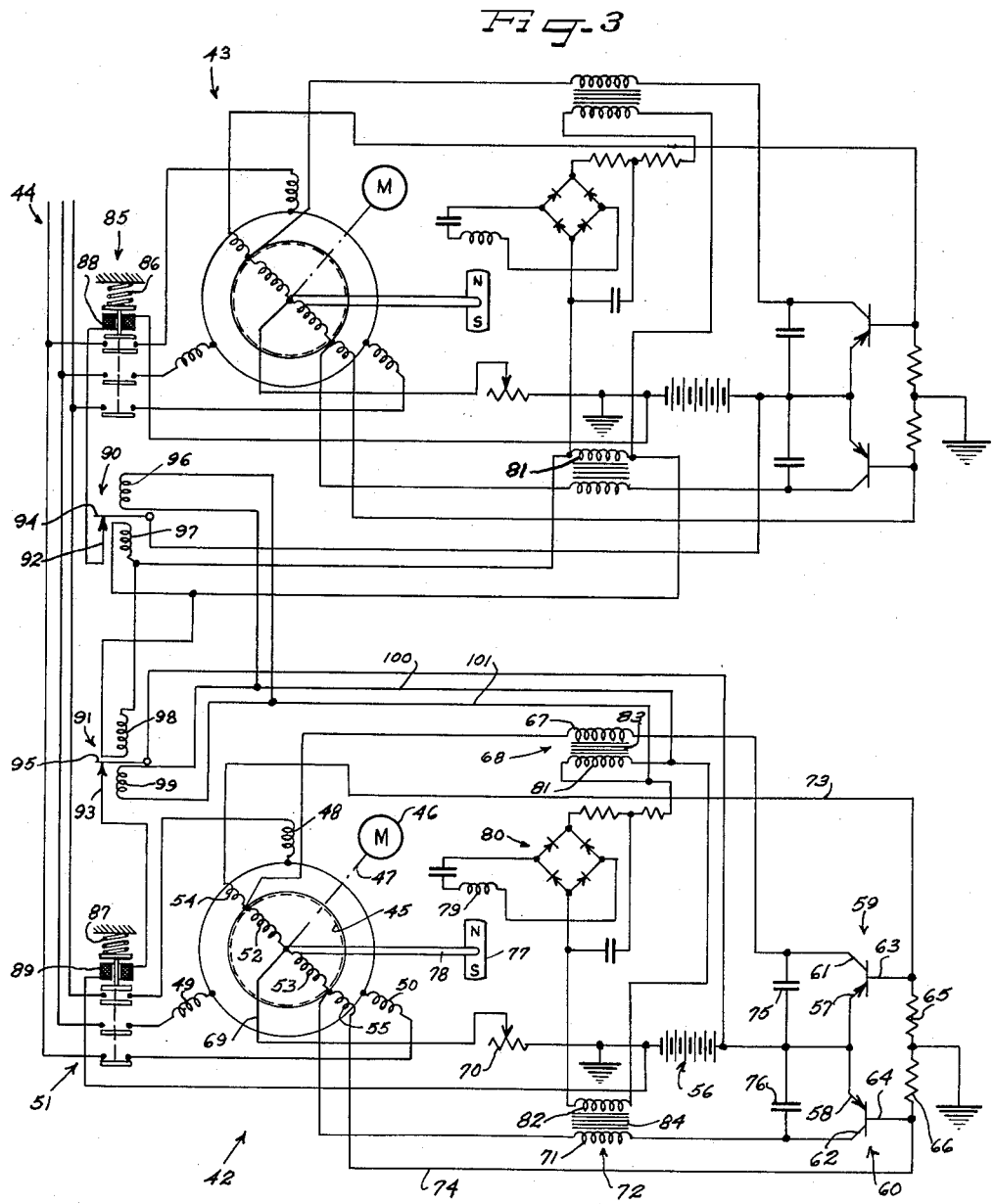

United States Patent Office 3,084,324
Patented Apr. 2, 1963

3,084,324
ALTERNATOR DRIVE
Achilles C. Sampietro, Birmingham, Mich., and John De Rolf Grigsby, Willoughby, Ohio, assignors to Thompson Ramo Wooldridge Inc., Cleveland, Ohio, a corporation of Ohio
Filed Aug. 2, 1960, Ser. No. 46,980
11 Claims. (Cl. 322—32)

This invention relates to alternator circuits and, more particularly, to a constant frequency variable speed alternator that is excited by a direct current source.

Considerable difficulty has been encountered in obtaining relatively constant frequency outputs from alternators. This difficulty usually arises because the alternator driver, which is usually a water wheel, windmill, internal or external combustion engines, etc. operates at a variable speed. Since, in conventional alternators, the frequency is directly proportional to the rate of rotation of its driver, a variation in one requires a variation in the other.

Attempts in the past to eliminate this difficulty have not been entirely satisfactory because they have usually required complex or slow acting mechanisms for varying the speed of the driver. For example, driving motors have been provided with governors which are very slow acting because they must first sense a change in the speed and then compensate for it. It can be seen that a mechanism which will allow the speed of the driving motor to vary and still maintain the alternator frequency constant has many advantages.

Accordingly, it is a primary object of this invention to provide a constant frequency variable speed alternator.

It is another object of this invention to provide means for maintaining the frequency of an alternator constant regardless of a variation in the speed of the mechanism driving the alternator.

It is still another object of this invention to provide means which is powered by a direct current source for maintaining the frequency of an alternator constant.

It is still another object of this invention to provide apparatus whereby a plurality of constant frequency variable speed alternator circuits can be connected to a bus bar in parallel and any one of the alternator circuits automatically disconnected from the bus bar should its frequency vary outside of predetermined limits.

Other objects, features and advantages of the present invention will be apparent from the following detailed description taken in conjunction with the accompanying figures of the drawings, in which:

FIGURE 1 is a schematic illustration of a constant frequency variable speed alternator circuit constructed in accordance with one embodiment of the invention;

FIGURE 2 illustrates the alternator circuit in greater detail; and

FIGURE 3 is an illustration of another embodiment of the invention wherein a plurality of constant frequency variable speed alternator circuits are connected to a bus bar in parallel.

As shown on the drawings:

The apparatus illustrated in FIGURE 1 includes an alternator 10 that is driven by a suitable motor 11. The alternator includes a stator 12 that has a winding 13 fixed to it, a rotatably mounted rotor 14 that is coupled to the motor 11 by a drive shaft 15, and a field winding 16 that is fixed to the rotor 14. The winding 13 on the stator 12 is connected to the output terminals 17 and 18 of the alternator and the winding 16 on the rotor 14 is connected to a variable frequency current source 19 by two conductors 20 and 21. Two other conductors 22 and 23 feed a portion of the alternating current output from the winding 13 back to the variable frequency current source 19 for purposes to be presently explained.

If the stator 12 is stationary and the frequency of the source 19 is zero, the frequency of the voltage generated in the winding 13 can be calculated from the equation:

$$f = \frac{N_p}{60} \quad (1)$$

where $f$ is the frequency in cycles per second, N is the rate of rotation of the rotor 14 in revolutions per minute, and $p$ is the number of pairs of poles on the rotor 14. It is clear that if N varies the frequency $f$ will also vary.

If instead of the stator 12 being held stationary it is also allowed to turn at the rate of $\pm N'$, the frequency of the voltage can be calculated from the equation:

$$f = \frac{(N \pm N')_p}{60} \quad (2)$$

where $N'$ will be positive when the direction of rotation of the rotor is opposite the direction of rotation of the stator and will be negative when the stator and the rotor turn in the same direction. It is apparent that if the rate of rotation N of the rotor is varied because of a variation in the speed of the motor 11, the frequency $f$ can nevertheless be held constant if the stator 12 also rotates. In this event, mechanical power corresponding to the rate of rotation of the stator multiplied by the torque input to it will either have to be furnished to or be taken from the stator. If the stator 12 requires energy in practical applications, it will usually be delivered by the motor 11.

In the foregoing discussion it has been assumed that the magnetic field set up by the rotor 14 has a constant value. If this magnetic field is made to vary by making the current flowing through the winding 16 a variable frequency alternating current, the frequency of the current in the winding 13 can also be maintained constant when the speed of the motor 11 varies by varying the frequency of the current in the winding 16. If the rotor 14 is held stationary and the exciting current is an alternating current, the speed $N_2$ of the rotating exciting field can be determined from the equation:

$$N_2 = \frac{60 f_1}{p} \quad (3)$$

where $f_1$ is the frequency of the current in the rotor winding 16 and $p$ is the number of pairs of poles on the rotor 14. By combining these equations, the frequency of the alternating current output from the winding 13 when the stator is stationary, the rotor is rotating, and an alternating current is flowing through the winding 16, can now be determined from the equation:

$$f = \frac{(N \pm N_2)_p}{60} \quad (4)$$

N is the rate of rotation of the rotor and $N_2$ is the rate of rotation of the exciting field relative to the rotor which is determined from equation 3.

It is apparent, therefore, that by properly varying $N_2$ the frequency $f$ of the alternating current output of the system can be maintained constant in spite of a variation in the speed N of the rotor 14 and the motor 11. If the speed of the motor 11 decreases, the speed $N_2$ of the rotating field will have to change in a negative direction. Conversely, if the speed of the motor 11 increases slightly, the rate of rotation $N_2$ of the rotating field will have to change slightly in a positive direction. If the speed of the motor 11 decreases, power will have to be supplied to the winding 16, while if the speed of the engine 11 increases, power will be taken from the winding 16.

FIGURE 2 illustrates a variable frequency alternating current source, constructed in accordance with the invention, which is connected to supply current to the field winding on the rotor 14.

The field winding on the rotor 14 is divided into two parts 24 and 25. The winding 24 is connected in series with a variable resistor 26, a battery 27, and an on-off switch 28. The winding 25 is connected in series with the switch 28 and the emitter 29 and collector 30 electrodes of a transistor 31. The base electrode 32 of the transistor 31 is connected through a variable inductor 33 to the output terminal 17 and also to a resistor 34. The other side of this resistor is connected to the conductor between the switch 28 and the winding 24.

The winding 24 is wound in a first direction on the rotor 14 and the winding 25 is wound in the opposite direction. In operation, the switch 28 is closed and the winding 24 generates a magnetic field that has a constant magnitude of +NI. The winding 25 generates a magnetic field that is controlled by the transistor 31 and is designed to vary between 0 and −2NI, or twice the magnitude of the flux generated by the winding 24. Since the field produced by these two windings 24 and 25 act in opposition, the resultant flux in the rotor 14 varies between +NI and −NI.

When the switch 28 is initially closed, current flows through the winding 24, and the connection between the negative terminal of the battery 27 and the base electrode 32 of the transistor through the resistor 34 causes the transistor 31 to begin conducting. The resultant field set up by these two windings induces a voltage in the winding 13 as the rotor 14 is driven by the motor 11. This induced voltage is fed back to the transistor by the connection between the base electrode 32 of the transistor and the terminal 17 of the output and controls the operation of the transistor. When the current through the transistor is at its minimum value, the potential at the terminal 17 due to the winding 24 flux, which has a value of +NI, will cause the transistor to begin conducting at a more rapid rate. After a length of time the current through the transistor will be at its maximum value and the flux due to the winding 25 will have a magnitude of −2NI. The potential at the terminal 17 due to the resultant flux of −2NI, biases the transistor toward its nonconducting state and shuts off the current flow through the winding 25. The circuit then begins a new cycle. The rate or frequency with which the transistor current changes from its minimum to maximum value and vice versa, depends on the reluctance and the time constant of the circuit that triggers the transistor 41. These factors can be varied by the variable inductor 33.

The inductance of the variable inductor 33 is controlled by the position of an iron core 35 that is pulled by a spring 36 in one direction and a coil 37 in the other direction. The magnitude of the current flowing in the coil 37, which is proportional to the pull exerted by it, is controlled by the frequency of the alternating current output of the system because this coil is connected in series with a capacitor 38 and across the terminals 17 and 18. The values of the capacitor 38 and the coil 37 are chosen such that if the frequency of the alternating current output increases slightly the impedance in this circuit decreases a corresponding amount and causes a slight increase in the current flowing through the coil 37. This increased current varies the position of the core 35 and the inductance of the winding 33.

It is apparent that the rate at which the transistor 31 is triggered can be varied an amount proportional to a variation away from a predetermined value of the rate of rotation of the rotor 14. By varying the frequency of the current flowing through the exciting windings on the rotor the frequency of the alternating current output can be maintained essentially constant regardless of a variation in the speed of the motor 11, as was explained previously.

Also shown in FIGURE 2 are two conductors 39 and 40 supplying a load that requires a direct current supply. The two conductors 39 and 40 are connected across the battery 27 and switch 28 and to the output of a bridge rectifier circuit 41. The rectifier circuit has its input connected across the output terminals 17 and 18 and places a full wave rectified voltage across the conductors 39 and 40.

FIGURE 3 illustrates the manner in which two or more three phase alternator circuits 42 and 43 can be parallelled on a bus system 44 and one of the alternator circuits automatically disconnected from the bus bar in the event its frequency varies beyond predetermined limits. Since these two alternator circuits are identical, the operation of only one will be discussed in detail.

The circuit 42 includes an alternator that has a rotor 45 that is connected to a motor 46 by a drive shaft 47. Three output windings 48, 49 and 50 are mounted on a stator and connected to the bus system 44 through a switch 51. On the rotor 45, two center tapped field windings 52 and 53 and two feedback windings 54 and 55 are mounted.

A variable frequency alternating current is supplied to the two field windings 52 and 53 by a circuit that includes a battery 56 that is connected to the emitter electrodes 57 and 58 of two transistors 59 and 60, respectively. The current flowing through the exciting winding 52 from the battery 56 flows along the path defined by the emitter electrodes 57 and the collector electrode 61 of the transistor 59, a winding 67 of a variable inductor 68, the winding 52, a conductor 69, a variable resistor 70, and the battery 56. Current through the winding 53 flows along the path defined by the battery 56, the emitter electrode 58 and collector electrode 62 of the transistor 60, a winding 71 of a variable inductor 72, the winding 53, conductor 69, variable resistor 70 and battery 56. The base electrodes 63 and 64 of the transistors 59 and 60 are connected to one end of each of the feedback windings 54 and 55 two conductors 73 and 74. The other end of each of the feedback windings 54 and 55 is connected to the windings 52 and 53.

Two capacitors 75 and 76 are connected between the emitter electrodes 57 and 58 and the collector electrodes 61 and 62 of the two transistors 59 and 60.

In operation, the two transistors 61 and 62 are biased such that they are initially conducting and current flows from the battery 56 through each of the transistors and through both of the field windings 52 and 53. These two windings 52 and 53 are wound so that the magnetic flux fields set up when current flows through these windings, add up and and induce voltages in the three phase windings 48, 49 and 50 as the rotor 45 is turned by the motor 46. These voltages are fed back to the base electrodes 63 and 64 of the two transistors by way of the two conductors 73 and 74 and cause the two transistor circuits to oscillate. The frequency at which they oscillate is determined in part by the reactances of the windings 67 and 71 and the capacitors 75 and 76 and, since the reactances of these windings 67 and 71 are variable, it is possible to vary the frequency of the transistor circuits.

The apparatus for varying the reactances of the windings 67 and 71 includes a spindle 77 that is coupled to the rotor 45 by a shaft 78 and a winding 79 that is mounted adjacent to the spindle 77. As the spindle 77 rotates, a voltage is induced in the winding 79 that is fed into a rectifier and filter circuit 80 which is connected in series with two windings 81 and 82 that are part of the variable inductors 68 and 72. In operation, if the rate of rotation of the rotor 45 increases the magnitude of the voltage induced in the winding 79 also increases. This action increases the magnitude of the current flowing through the windings 81 and 82 and the magnetic flux density in the iron cores 83 and 84 of these two variable inductors. The reactances in the two transistor circuits also changes which varies the frequency of these circuits.

The alternator circuit 43 operates in exactly the same manner as the circuit 42 and therefore will not be discussed. It should be understood that while these two circuits are shown as being three phase generators they could also be single phase, double phase, etc.

The apparatus for connecting two or more of these constant frequency variable speed alternators in parallel on the bus bar 44 includes the switch 51 and a switch 85 that connects the windings of the circuit 43 to the bus bar. The switches 85 and 51 includes springs 86 and 87 which tend to disconnect the phase windings from the bus bar 44 and holding solenoids 88 and 89 which tend to connect these windings to the bus bar. The energization of the solenoids 88 and 89 by the batteries 56 is controlled by two switches 90 and 91 which include stationary contacts 92 and 93 and movable contacts 94 and 95. The movable contact 94 is under the control of two windings 96 and 97 and the movable contact 95 is under the control of two windings 98 and 99. When the windings 96 and 98 are energized they tend to open these switches.

The windings 96 and 99 are connected by two conductors 100 and 101 across the winding 81 of the alternator circuit 42 so that the pull exerted by these two windings is proportional to the rate of rotation of the alternator of this circuit. The windings 97 and 98 are connected across the winding 81 of the alternator circuit 43 so that the pull exerted by these two windings is proportional to the rate of rotation of the alternator in the circuit 43.

It can be seen that if the rate of rotation of the rotor in the circuit 42 is slightly less than the rate of rotation of the rotor in the circuit 43, the pull exerted by the winding 99 will be less than that of the winding 98 and the switch 91 will open. The decreased current in the windings 96 will not effect the position of the switch 90 in this instance. When the switch 91 opens it disconnects the holding solenoid 89 from the battery 56 and the spring 87 forces the switch 51 open, which disconnects the alternator circuit 42 from the bus system 44.

In similar manner, if the rate of rotation of the rotor in the circuit 43 is slightly less than the rate of rotation of the rotor in the circuit 42, the circuit 43 will be disconnected from the bus bar because the pull exerted by the winding 97 will be less than the pull exerted by the winding 96.

Conventional phasing equipment (not shown) should be provided for "synchronizing" the alternator circuits before connecting them on a bus system. It is obvious that while only two alternator circuits have been shown connected to the bus system 44, numerous others could also be provided and coupled together in the manner shown. Also, only one of the alternator circuits of the type shown in FIGURE 3 could be used without the apparatus for connecting it to a bus system.

It is apparent that a novel and useful alternating current power supply has been provided. A power supply constructed in accordance with the invention is able to provide alternating current at an essentially constant frequency regardless of the rate of rotation of its driving motor. Such a system is also novel in that the variable frequency current in the field windings is derived from a unidirectional voltage source. Another novel aspect of the invention lies in the apparatus for connecting a plurality of these systems in parallel on a bus system and the means for disconnecting any one of them should its frequency fall below that of the others.

It will be apparent that many modifications and variations may be effected without departing from the scope of the novel concepts of the present invention.

We claim as our invention:

1. A system for producing alternating current at a constant frequency comprising a plurality of units, each of said units having a rotatably mounted member that is adapted to be coupled to a drive motor, a first winding inductively coupled with said member, a variable frequency alternating current source coupled to said first winding, a second winding mounted adjacent to said member such that a voltage is induced in said second winding when current flows through said first winding and said member is rotated by its associated drive motor, means responsive to the rate of rotation of said member and coupled to said alternating current source for varying the frequency of said alternating current source in accordance with variations in the rate of rotation of said member, a plurality of switch means coupling said second winding of each of said units to a bus system, each of said switch means being adapted to open in the event the frequency of the voltage induced in its associated second winding falls below the frequency of the voltages induced in said second windings of the other of said plurality of units.

2. A system for producing alternating current at a constant frequency comprising a rotatably mounted member adapted to be connected to a drive motor, a first winding inductively coupled with said member, a transistorized variable frequency alternating current source connected to said first winding, a source of direct current connected to supply power to said transistorized current source, a second winding mounted adjacent to said member so that a voltage is induced in said second winding when current flows through said first winding and said member rotates, and means coupled to said current source for varying the frequency of said current source in response to variations in the rate of rotation of said member.

3. A system for producing alternating current comprising a rotatably mounted member adapted to be connected to a drive motor, at least a first winding mounted on said member, means for supplying variable current to said first winding so that a variable magnetic field is developed around said member, at least one second winding mounted adjacent to said member and in inductive coupling with the magnetic field so that a voltage is induced in said second winding when said member rotates and current flows through said first winding, and means for changing the frequency of the variable magnetic field in response to changes in the rate of rotation of said member in such a manner that the frequency of the voltage induced in said second winding is maintained constant.

4. A system for producing alternating current at a constant frequency comprising a rotatably mounted member adapted to be connected to a drive motor, a first winding inductively coupled with said member, a unidirectional voltage source connected to energize said first winding, a second winding inductively coupled with said member, circuit means connected to said second winding which is adapted to produce a variable frequency alternating current, means for varying the frequency of said circuit means, at least one third winding mounted adjacent to said member such that a voltage is induced in said third winding when current flows through said first and second windings and said member is rotated by said drive motor, said frequency varying means being automatically responsive to changes in the frequency of the voltage induced in said third winding.

5. A system for producing alternating current comprising a rotatably mounted member adapted to be connected to a drive motor, a first winding inductively coupled with said member, a unidirectional voltage source connected to energize said first winding, a second winding inductively coupled with said member, a variable frequency alternating current source connected to energize said second winding, a third winding mounted adjacent to said member such that a voltage is induced in said second winding when current flows through said first and second windings and said member is rotated by the drive motor, and means electrically coupling said third winding to said alternating current source in such a manner as to vary the frequency of said source in accordance with variations in the frequency of said voltage induced in said third winding.

6. A system for producing alternating current comprising a rotatably mounted member adapted to be connected to a drive motor, a first winding inductively coupled with said member, a unidirectional voltage source connected to energize said first winding, a second winding inductively coupled with said member, a transistorized variable frequency alternating current source connected to energize said second winding, said unidirectional voltage source being connected to energize said alternating current source, a third winding mounted adjacent to said member such that an alternating current voltage is induced in said third winding when current flows through said first and second windings and said member is rotated by the drive motor, and means coupled to said third winding for varying the frequency of said alternating current source in accordance with variations in the frequency of the voltage induced in said third winding in such a manner as to maintain the frequency of the voltage constant.

7. A system for producing alternating current at a constant frequency comprising a rotatably mounted member adapted to be connected to a drive motor, at least one winding inductively coupled with said member, a variable frequency alternating current source connected to energize said first winding, at least one second winding mounted adjacent to said member such that a voltage is induced in said second winding when current flows through said first winding and said member is rotated by said drive motor, circuit means adapted to generate a voltage that is responsive to the rate of rotation of said member, said circuit means being connected to vary the frequency of said alternating current source.

8. A system for producing alternating current at a constant frequency comprising a plurality of units connected in parallel to a bus system each of said units comprising a rotatably mounted member adapted to be connected to a drive motor, at least one first winding inductively coupled with said member, a variable frequency alternating current source connected to energize said first winding, at least one second winding mounted adjacent to said member such that a voltage is induced in said second winding when current flows through said first winding and said member is rotated by said drive motor, means coupled to said member for developing a voltage that is responsive to the rate of rotation of said member, said voltage being connected to adjust the frequency of said alternating current source in accordance with variations in the rate of rotation of said member, each of said units being connected to said bus system by a separate switch, said switch for each of said units being connected to be responsive to the rate of rotation of said member of said units.

9. A system for producing alternating current comprising a rotatably mounted member, a plurality of first windings inductively coupled with said member, a variable frequency alternating current source connected to energize said plurality of first windings, a plurality of second windings mounted adjacent to said member such that a voltage is induced in said second windings when current flows through said first windings and said member is rotated, a magnet connected to said member in such a manner that it is rotated at a rate that is proportional to the rate of rotation of said member, a third winding inductively coupled with said magnet such that a control voltage is induced in said third winding when said magnet is rotated, said control voltage induced in said third winding being responsive to the rate of rotation of said member and being coupled to said variable frequency alternating current source such that it varies the frequency of said source in accordance with variations in the rate of rotation of said member.

10. A system for producing alternating current at a constant frequency comprising a rotatably mounted member adapted to be connected to a drive motor, a plurality of first windings inductively coupled with said member, a variable frequency alternating current source connected to energize said plurality of first windings, a plurality of second windings inductively coupled with said plurality of first windings and connected through a plurality of variable reactances to said variable frequency alternating current source, a plurality of third windings mounted adjacent to said members such that voltages are induced in them when current flows through said plurality of first windings and said member is rotated, means coupled to said member for generating a control voltage that is responsive to the rate of rotation of said member, said control voltage being connected to adjust the settings of said variable reactances, and switch means connecting said plurality of third windings to a bus system, said switch means being automatically responsive to the magnitude of said control voltage.

11. A system for producing alternating current at a constant frequency comprising a plurality of units, each of said units comprising a rotatably mounted member, a plurality of first windings inductively coupled with said member, variable frequency alternating current sources connected to energize said plurality of first windings, a plurality of second windings inductively coupled with said plurality of first windings and connected through a plurality of variable reactances to said variable frequency alternating current sources, a plurality of third windings mounted adjacent to said member such that voltages are induced in them when current flows through said plurality of first windings, a rotatably mounted magnet coupled to said member, a fourth winding inductively coupled with said magnet such that a voltage is induced in said fourth winding when said magnet and said member is rotated, said voltage induced in said fourth winding being connected to vary the reactance of said variable reactor, switch means connecting said third windings in each of said units to a bus system, said switch means being connected to automatically disengage said third windings from said bus system if the frequency of the voltages induced in said plurality of third windings falls below the frequency of the voltages induced in said plurality of third windings of the other of said plurality of units.

References Cited in the file of this patent

UNITED STATES PATENTS

| | | |
|---|---|---|
| 2,854,617 | Johnson | Sept. 30, 1958 |
| 2,859,358 | King | Nov. 4, 1958 |
| 2,886,766 | Gibson | May 12, 1959 |